US012762822B2

(12) United States Patent
Giger et al.

(10) Patent No.: US 12,762,822 B2
(45) Date of Patent: Oct. 13, 2026

(54) SYSTEMS AND METHODS FOR ELECTRONICALLY REMOVING LESIONS FROM THREE-DIMENSIONAL MEDICAL IMAGES

(71) Applicant: The University of Chicago, Chicago, IL (US)

(72) Inventors: Maryellen Giger, Elmhurst, IL (US); Lindsay Douglas, Lee's Summit, MO (US); Deepa Sheth, Chicago, IL (US)

(73) Assignee: The University of Chicago, Chicago, IL (US)

( * ) Notice: Subject to any disclaimer, the term of this patent is extended or adjusted under 35 U.S.C. 154(b) by 539 days.

Patent file contains an affidavit/declaration under 37 CFR 1.130(b).

(21) Appl. No.: 18/161,160

(22) Filed: Jan. 30, 2023

(65) Prior Publication Data

US 2023/0245417 A1 Aug. 3, 2023

Related U.S. Application Data

(60) Provisional application No. 63/267,446, filed on Feb. 2, 2022.

(51) Int. Cl.
*G06V 10/26* (2022.01)
*G06V 10/82* (2022.01)

(52) U.S. Cl.
CPC .............. *G06V 10/26* (2022.01); *G06V 10/82* (2022.01); *G06V 2201/03* (2022.01)

(58) Field of Classification Search
CPC ............................... G06V 10/26; G06V 10/82
See application file for complete search history.

(56) References Cited

U.S. PATENT DOCUMENTS

2022/0358640 A1* 11/2022 Sakashita ............. A61B 3/0025
2023/0023042 A1* 1/2023 Bernard ................ G06T 7/0012

FOREIGN PATENT DOCUMENTS

CN 114066911 A * 2/2022 ............. G06N 3/045

OTHER PUBLICATIONS

Antropova, N. et al., "Use of clinical MRI maximum intensity projections for improved breast lesion classification with deep convolution neural networks", Journal of Medical Imaging, 5(1): 014503-1-014503-6 (Jan.-Mar. 2018).

(Continued)

*Primary Examiner* — David Perlman
(74) *Attorney, Agent, or Firm* — Cozen O'Connor

(57) ABSTRACT

A method for electronically removing a lesion from a three-dimensional (3D) medical image includes segmenting each two-dimensional (2D) slice of a sequence of 2D slices of the 3D medical image to identify the lesion within any one or more of the 2D slices. The method includes deleting the lesion from each 2D slice in which the lesion was identified to create a sequence of lesion-deleted slices. The method includes constructing, based on the sequence of lesion-deleted slices, a lesion-deleted intensity-based projection image, such as a lesion-deleted maximum-intensity projection image. The method includes processing the lesion-deleted intensity-based projection image to obtain a background parenchymal enhancement (BPE) score. The method excludes high-intensity voxels that indicate the presence of a lesion, and thus are not indicative of BPE.

18 Claims, 5 Drawing Sheets

(56) References Cited

OTHER PUBLICATIONS

Bhooshan, N. et al., "Potential of Computer-Aided Diagnosis of High Spectral and Spatial Resolution (HiSS) MRI in the Classification of Breast Lesions", Journal of Magnetic Resonance Imaging, 39: 59-67 (2014).
Chen, W. et al., "A Fuzzy C-Means (FCM)-Based Approach for Computerized Segmentation of Breast Lesions in Dynamic Contrast-Enhanced MR Images[1]", Academic Radiology, 13(1): 63-72 (Jan. 2006).
Cicek, O. et al., "3D U-Net: Learning Dense Volumetric Segmentation from Sparse Annotation", Springer International Publishing AG, 424-432 (2016).
Huynh, B. et al., "Digital mammographic tumor classification using transfer learning from deep convolutional neural networks", Journal of Medical Imaging, 3(3): 034501-1-034501-5 (Jul.-Sep. 2016).
King, V. et al., "Background Parenchymal Enhancement at Breast MR Imaging and Breast Cancer Risk[1]", Radiology, 260(1): 50-60 (Jul. 2011).
Ronneberger, O. et al., "U-Net: Convolutional Networks for Biomedical Image Segmentation", arXiv:1505.04597v1 [cs.CV], 1-8 (May 18, 2015).
Saha, A. et al., "Machine learning-based prediction of future breast cancer using algorithmically measured background parenchymal enhancement on high-risk screening MRI", J Magn Reson Imaging, 50(2): 456-464 (Aug. 2019).
Sheth, D., MD et al., "Artificial Intelligence in the Interpretation of Breast Cancer on MRI, International Society for Magnetic Resonance in Medicine", 1-15 (2019).

* cited by examiner

SYSTEMS AND METHODS FOR ELECTRONICALLY REMOVING LESIONS FROM THREE-DIMENSIONAL MEDICAL IMAGES

RELATED APPLICATIONS

This application claims priority to U.S. Provisional Patent Application No. 63/267,446, filed on Feb. 2, 2022, the entirety of which is incorporated by reference herein.

STATEMENT REGARDING FEDERALLY SPONSORED RESEARCH OR DEVELOPMENT

This invention was made with government support under grant numbers CA195564 and CA014599 awarded by the National Institutes of Health. The government has certain rights in the invention.

BACKGROUND

Dynamic contrast enhanced magnetic resonance (DCE-MR) imaging is sometimes used to supplement mammography for cancer detection. Unlike conventional two-dimensional mammograms typically used for screening, DCE-MR imaging produces three-dimensional scans that allow a radiologist to observe internal breast features from different directions, thereby helping the radiologist to visually discern between healthy fibroglandular tissue and lesions. DCE-MR imaging is typically used for diagnostic breast imaging, such as mapping tumor size and estimating tumor pathological stage and grade. As such, DCE-MR images can be used as a guide for clinical treatment or follow-up screenings.

SUMMARY

In dynamic contrast enhanced magnetic resonance (DCE-MR) imaging, a paramagnetic contrast agent injected intravenously into a patient interacts with protons in water to decrease the relaxation time $T_1$. The result is increased visibility (i.e., contrast enhancement) of blood vessels in the MR image. Typically, a $T_1$-weighted scan is acquired prior to injection of the contrast agent. This scan is typically referred to as a pre-contrast scan. One or more additional $T_1$-weighted scans are then acquired after the contrast agent is injected (and while the contrast agent is still inside the patient). These additional scans are typically referred to as "post-contrast" scans. The pre-contrast scan is subtracted from each post-contrast scan to obtain a subtraction scan. Advantageously, this subtraction cancels out normally occurring spatial variations in $T_1$ that are independent of the contrast agent, thereby improving accuracy and resolution.

DCE-MR imaging increases visibility of vasculature, particularly excess blood vessels formed from lesion-induced angiogenesis, and therefore can be used to spatially determine the location, presence, and/or size of a lesion that may have produced the excess blood vessels. However, vasculature in healthy breast tissue will also be contrast enhanced, an effect known as background parenchymal enhancement (BPE). It was originally hypothesized that BPE negatively impacts MR imaging interpretation by masking malignant lesions. It has since been demonstrated that BPE has minimal impact on interpretation. Interestingly, BPE has been shown to be strongly linked to breast cancer risk and treatment outcomes. Accordingly, there is much interest in identifying quantitative BPE biomarkers that could aid in clinical decision making.

The present embodiments electronically detect and remove one or more lesions from a DCE-MR image. When assessing BPE, many radiologists include lesions, which can be a source of systematic error that skews resulting BPE estimates to higher values. By removing this error source, the present embodiments both improve the accuracy of the BPE assessment and reduce intra-observer variability. The present embodiments operate "electronically" or "automatically" in that all image processing steps are performed algorithmically (i.e., by computer) and therefore without the need of a radiologist.

DETAILED DESCRIPTION

Figure 1A:
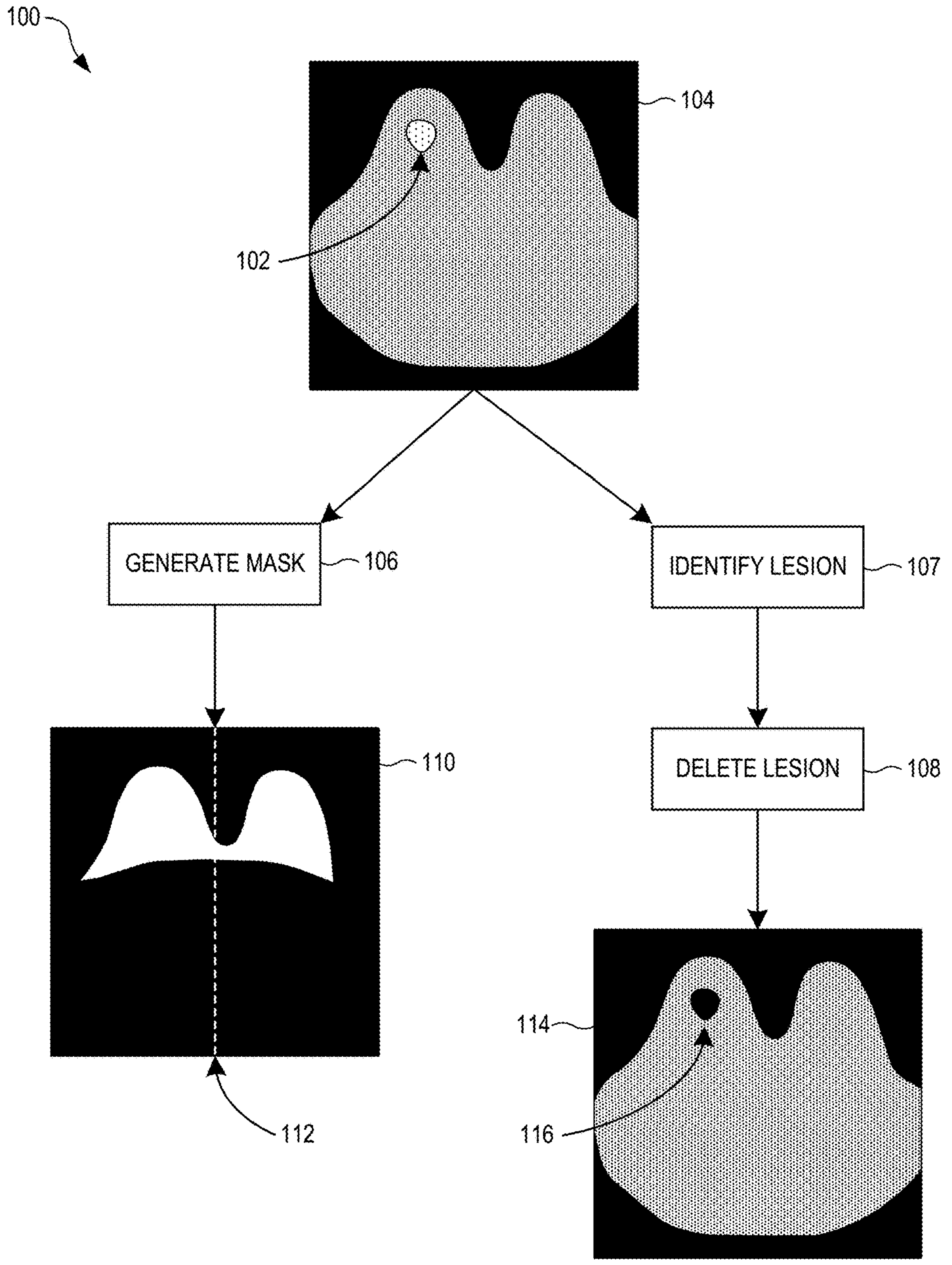
FIG. 1A illustrates a method for identifying and removing a lesion from a two-dimensional medical image, in embodiments.

FIG. 1A illustrates a method 100 for identifying and removing a lesion 102 from a two-dimensional (2D) medical image 104. In the example of FIG. 1A, the image 104 is an axial view of a patient in which both breasts are visible. The image 104 is one slice of a three-dimensional (3D) scan forming a sequence of 2D slices (see the scan 204 in FIG. 2). Within the context of the 3D scan, each pixel of the image 104 is also referred to as a voxel. The image 104 is calculated by subtracting one slice of a pre-contrast scan from a corresponding slice of a post-contrast scan. These pre-contrast and post-contrast scans may be obtained via dynamic contrast enhanced magnetic resonance (DCE-MR) imaging.

In block 107 of the method 100, the medical image 104 is segmented to identify the lesion 102. The lesion 102 may be segmented using a clustering algorithm, such as a fuzzy c-means clustering algorithm [1]. However, another lesion-segmentation technique may be used for the block 107 without departing from the scope hereof.

In block 108 of the method 100, the lesion 102 is deleted from the medical image 104 to generate a lesion-deleted image 114 that is identical to the medical image 104 except that the information content of every voxel of the lesion 102 has been deleted or replaced. For example, a replacement value (e.g., 0) may be stored identically in all voxels of the lesion 102. In this case, the lesion 102 is replaced with a void 116 whose voxels all have the same replacement value. The replacement value may correspond to a non-physical value. For example, if each voxel of the image 104 is a grayscale value between 0 and 1, the replacement value may be "−1" to indicate voxels that were deleted.

Figure 1B:
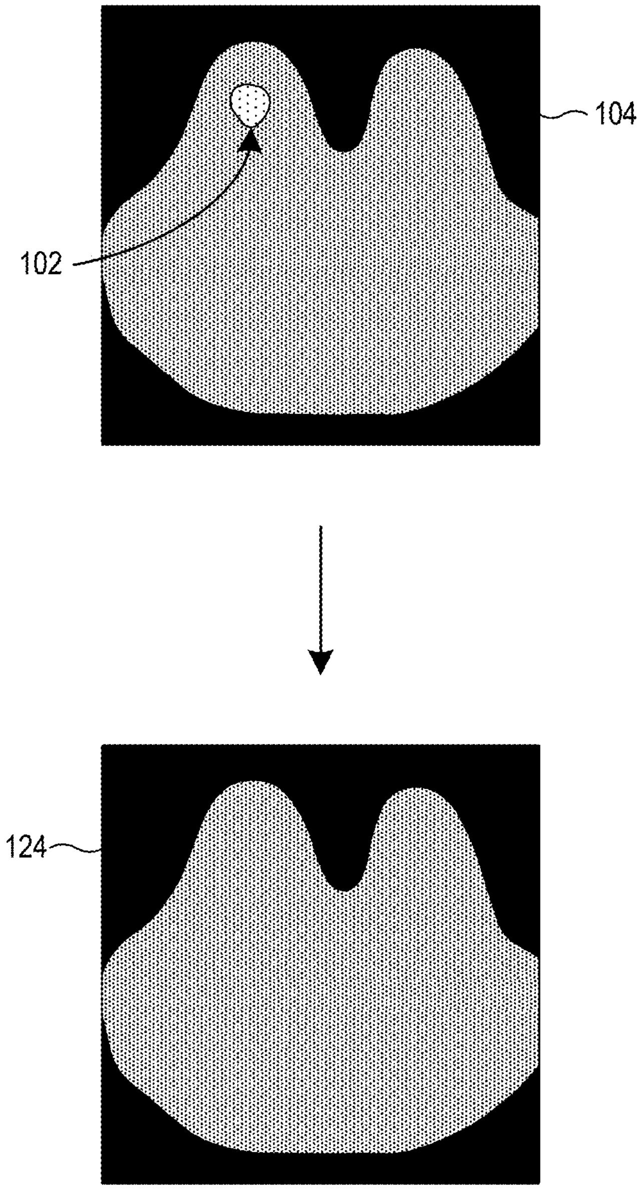
FIG. 1B illustrates an alternative way of deleting the voxels of the lesion of FIG. 1A, in an embodiment.

FIG. 1B illustrates an alternative way of deleting the voxels of the lesion 102 to generate a lesion-deleted image 124. Here, the replacement value is derived from the values of neighboring voxels that are outside the lesion 102. For example, a replacement value may be derived from the average of neighboring voxels that border the lesion 102. Alternatively, the replacement value may be a weighted sum in which the weight of each neighboring voxel is based on the distance to the neighboring voxel. In these embodiments, the replacement value need not be identical for all voxels in the lesion 102. As can be seen in FIG. 1B, the lesion-deleted image 124 is similar to the lesion-deleted image 114 of FIG. 1A except that the void 116 is no longer present. Accordingly, the lesion-deleted image 124 estimates what the medical image 104 would look like if healthy tissue had been present instead of the lesion 102.

In block 106 of the method 100, a mask 110 is generated by processing the medical image 104 to identify the breasts from other visible structures (e.g., the chest wall). This processing is also referred to as "breast segmentation." In one implementation, this breast segmentation uses a trained convolutional neural network (CNN) with localization to classify each voxel of the image 104 (see CNN 342 in FIG. 3). For example, the CNN may be a U-Net [2]. The output of the CNN is a 2D map in which each pixel has a class label identifying how the corresponding voxel of the image 104 is classified. Voxels classified as breast tissue collectively define a region-of-interest that is then binarized (e.g., by applying a binary threshold to each pixel) to obtain the mask 110. In the mask 110, white regions indicate pixels with a value of 1 and black regions indicate pixels with a value of 0. A pixel value of 1 indicates that the corresponding voxel should be included when generating an intensity-based projection image, while a pixel value of 0 indicates that the corresponding voxel should be excluded. One example of an intensity-based projection image is a maximum-intensity projection (MIP) image.

The CNN may have been previously trained for breast segmentation or similar identification of regions of interest. Alternatively, the method 100 may include training an untrained CNN with a plurality of training images to create the trained CNN. For example, the CNN may be trained by the same party that uses the CNN to perform the method 100.

Breast segmentation may also include breast splitting, as indicated in FIG. 1A by a vertical line 112 that splits the mask 110 between the left and right breasts. With the vertical line 112, the left and right breasts can be separately processed by setting all pixels to the left or right of the vertical line 112 to zero. In this way, the vertical line 112 could be used to determine a background parenchymal enhancement (BPE) score for each breast individually, or to create an intensity-based projection image (e.g., a MIP image) of each breast individually. Alternatively, the vertical line 112 could be used to compare the left and right breasts (e.g., calculating a difference in BPE scores between the left and right breasts). However, the vertical line 112 may be excluded (e.g., to create an intensity-based projection image in which both breasts are visible).

Figure 2:
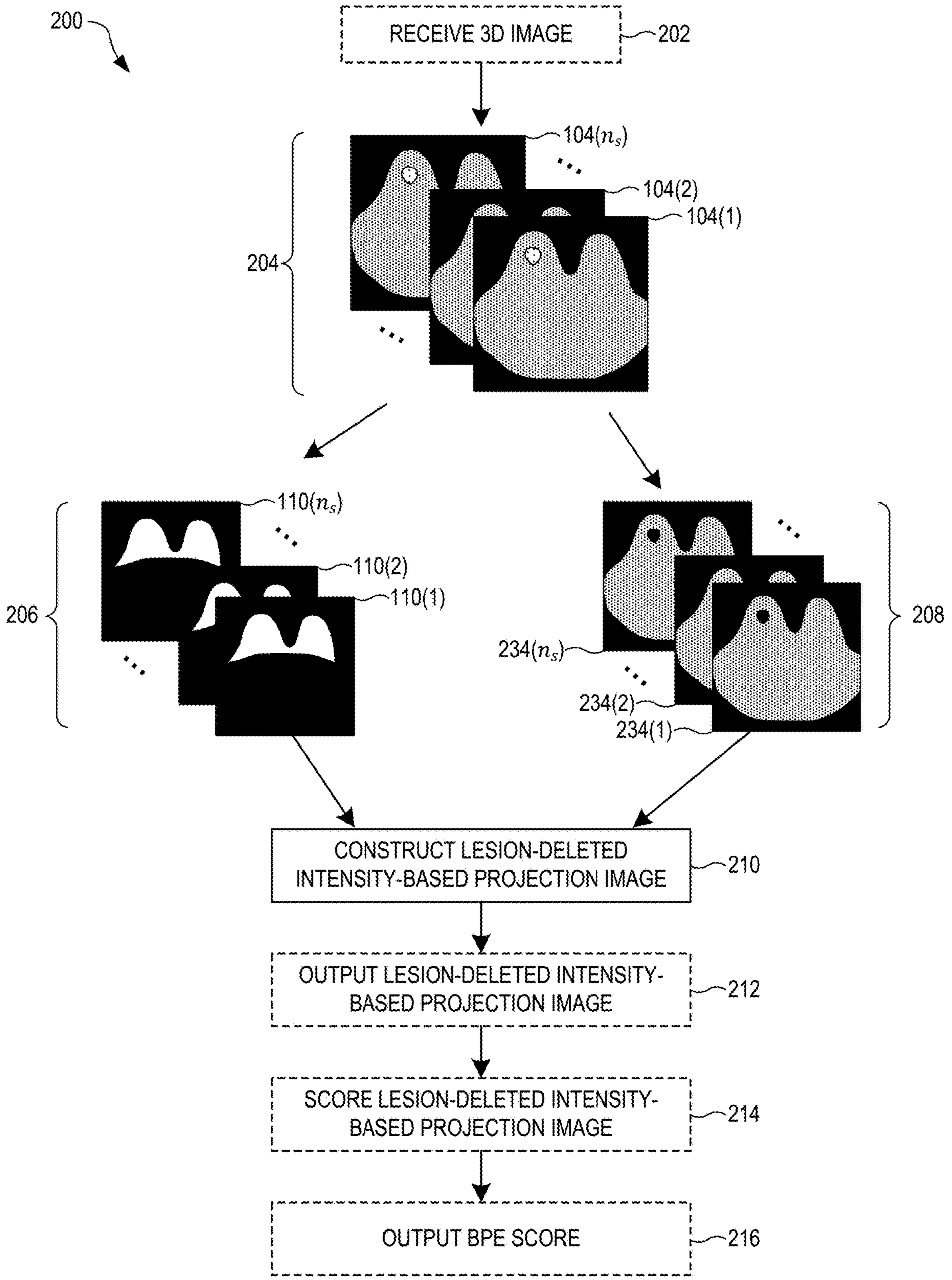
FIG. 2 illustrates a method for electronically removing a lesion from a three-dimensional medical image, in embodiments.

FIG. 2 illustrates a method 200 for electronically removing a lesion from a 3D medical image. Advantageously, the method 200 improves the accuracy of BPE scores by excluding high-intensity voxels that indicate the presence of a lesion, and thus are not indicative of background parenchymal enhancement. The 3D image is referred to as a scan 204 and is formed from a sequence of $n_s$ images 104, each of which is also referred to as a "slice." The method 200 repeats the method 100 of FIG. 1A for each slice 104($i$) to generate one corresponding mask 110($i$) and one corresponding lesion-deleted slice 234($i$). In one embodiment, each lesion-deleted slice 234($i$) is a lesion-deleted slice 114 of FIG. 1A. In another embodiment, each lesion-deleted slice 234($i$) is a lesion-deleted slice 124 of FIG. 1B.

The masks 110($i$) form a mask sequence 206 and the lesion-deleted slices 234($i$) form a lesion-deleted scan 208. Note that one or more of the masks 110($i$) may be fully "unblocked," i.e., all of its pixels have a value of one. Thus, it is not required that at least one voxel be masked from each slice 104. In one embodiment, only one mask is used for all of the $n_s$ images 104. In this embodiment, the mask sequence 206 may be thought of as having only the one mask.

Figure 3:
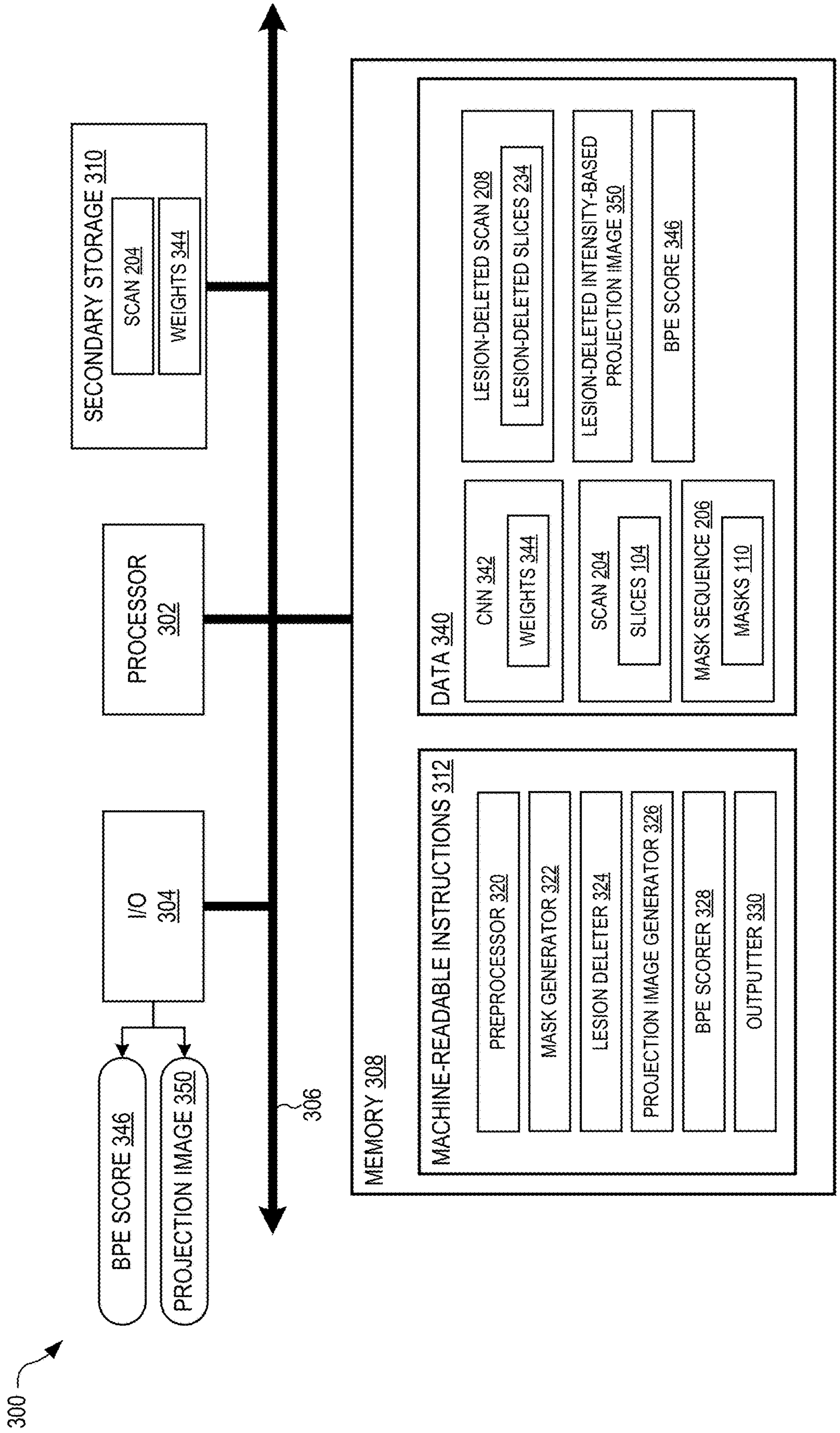
FIG. 3 is a diagram of a system for electronically removing a lesion from a three-dimensional medical image, in embodiments.

In block 210 of the method 200, a lesion-deleted intensity-based projection image is constructed from the lesion-deleted scan 208 (see the lesion-deleted intensity-based projection image 350 in FIG. 3). This intensity-based projection image may be a MIP image. As part of the block 210, the mask sequence 206 may be used to block voxels from contributing to the lesion-deleted intensity-based projection image. The method 200 may also include the block 212 in which the lesion-deleted intensity-based projection image is outputted.

In some embodiments, the method 200 includes the block 214 in which a BPE score is calculated based on the lesion-deleted intensity-based projection image (see BPE score 346 in FIG. 3). The method 200 may also include the block 216 in which the BPE score is outputted. In some embodiments, the method 200 includes the block 202 in which the scan 204 is received. For example, the scan 204 may be received from a medical imaging device, such as a magnetic resonance imaging (MRI) scanner. Although not shown in FIG. 2, the method 200 may further include operating the medical imaging device to obtain the scan 204.

In another embodiment, a method for electronically removing a lesion from a 3D medical image is similar to the method 200 except that an intensity-based projection image that contains the lesion is first generated, after which the lesion is removed from the projection image. Specifically, the scan 204 (i.e., the sequence of $n_s$ images 104 forming the 3D medical image) may first be processed to construct an intensity-based projection image (e.g., a maximum-intensity projection image) that contains a projection of the lesion. This projection image is then segmented to identify the projection of the lesion therein. The projection of the lesion may then be deleted from the projection image to generate a lesion-deleted intensity-based projection image. For example, the segmentation may produce a two-dimensional mask that can be subsequently used to filter out (e.g., delete or replace) those pixels of the projection image that belong to the lesion. Similar to the method 200, this lesion-deleted projection image may be subsequently processed to obtain a BPE score (see the block 214 in FIG. 2).

FIG. 3 is a diagram of a system 300 for electronically removing a lesion from a 3D medical image. The system 300 is a computing device that implements the present method embodiments. The system 300 includes a processor 302, a memory 308, and a secondary storage device 310 that communicate with each other over a system bus 306. For example, the memory 308 may be volatile RAM located proximate to the processor 302 while the secondary storage device 310 may be a hard disk drive, a solid-state drive, an optical storage device, or another type of persistent data storage. The secondary storage device 310 may alternatively be accessed via an external network instead of the system bus 306. Additional and/or other types of the memory 308 and the secondary storage device 310 may be used without departing from the scope hereof.

The system 300 may include at least one I/O block 304 that outputs one or both of a BPE score 346 and a lesion-deleted intensity-based projection image 350 to a peripheral device (not shown). The I/O block 304 is connected to the system bus 306 and therefore can communicate with the processor 302 and the memory 308. In some embodiments, the peripheral device is a monitor or screen that displays one or both of the BPE score 346 and the lesion-deleted projection image 350. Alternatively, the I/O block 304 may implement a wired network interface (e.g., Ethernet, Infiniband, Fibre Channel, etc.), wireless network interface (e.g., WiFi, Bluetooth, BLE, etc.), cellular network interface (e.g., 4G, 5G, LTE), optical network interface (e.g., SONET, SDH, IrDA, etc.), multi-media card interface (e.g., SD card, Compact Flash, etc.), or another type of communication port through which the system 300 can communicate with another device.

The processor 302 may be any type of circuit or integrated circuit capable of performing logic, control, and input/output operations. For example, the processor 302 may include one or more of a microprocessor with one or more central processing unit (CPU) cores, graphics processing unit (GPU), digital signal processor (DSP), field-programmable gate array (FPGA), system-on-chip (SoC), microcontroller unit (MCU), and application-specific integrated circuit (ASIC). The processor 302 may also include a memory controller, bus controller, and other components that manage data flow between the processor 302, the memory 308, and other devices communicable coupled to the bus 306. Although not shown in FIG. 3, the system 300 may include a co-processor (e.g., a GPU or machine-learning accelerator) that is communicably coupled with the processor 302 over the bus 306. The co-processor may assist with execution of one or both of lesion segmentation (e.g., fuzzy c-means clustering) and breast segmentation (e.g., the U-Net).

The memory 308 stores machine-readable instructions 312 that, when executed by the processor 302 (and co-processor, when present), control the system 300 to implement the functionality and methods described herein. The memory 308 also stores data 340 used by the processor 302 (and co-processor, when present) when executing the machine-readable instructions 312. In the example of FIG. 3, the data 340 includes a CNN 342 having weights 344, the slices 104 of the scan 204, the one or more masks 110 of the mask sequence 206, the lesion-deleted slices 234 of the lesion-deleted scan 208, the lesion-deleted projection image 350, and the BPE score 346. The memory 308 may store additional data 340 than shown. In addition, some or all of the data 340 may be stored in the secondary storage device 310 and fetched therefrom when needed. In FIG. 3, the secondary storage device 310 stores the scan 204 and the CNN weights 344.

In the example of FIG. 3, the machine-readable instructions 312 include a preprocessor 320, mask generator 322, lesion deleter 324, projection image generator 326, BPE scorer 328, and outputter 330. The preprocessor 320 processes each slice 104 to perform cropping, scaling, filtering, windowing, segmenting, or a combination thereof. The mask generator 322 implements the block 106 of the method 100 by processing each slice 104 to generate one corresponding mask 110. Alternatively, the mask generator 322 may generate a single mask to be used for all the slices 104. The lesion deleter 324 implements the blocks 107 and 108 of the method 100 to generate one lesion-deleted slice 234 for each slice 104. The projection image generator 326 implements the block 210 of the method 200 by constructing the lesion-deleted projection image 350 based on the lesion-deleted scan 208 and the mask sequence 206. Alternatively, when only a single mask is used for all of the slices 104, the projection image generator constructs the lesion-deleted projection image 350 based on the lesion-deleted scan 208 and the single mask. The BPE scorer 328 implements the block 214 of the method 200 by processing the lesion-deleted projection image 350 to obtain the BPE score 346. The outputter 330 implements one or both of the blocks 212 and 216 of the method 200 to output one or both of the lesion-deleted projection image 350 and BPE score 346. The memory 308 may store additional machine-readable instructions 312 than shown in FIG. 3 without departing from the scope hereof.

In some embodiments, the system 300 is incorporated into an MRI scanner. In these embodiments, the system 300 may cooperate with the MRI scanner to receive the scan 204 and output one or both of the lesion-deleted projection image 350 and BPE score 346. In other embodiments, the system 300 is separate from the MRI scanner. In these embodiments, the system 300 may communicate with the MM scanner (e.g., via an Ethernet connection) to receive the scan 204. In other embodiments, the system 300 operates independently of any MRI scanner. For example, the system 300 may download the scan 204 from a server, memory stick, or flash drive.

While the present embodiments have been described as operating MRI images, the present embodiments may also be used with another type of topographic medical imaging technique, such as computed tomography (CT) scanning, positron emission tomography (PET), ultrasonography, optical coherent tomography, photoacoustic tomography, and single-photon emission computed tomography (SPECT). Similarly, while the present embodiments have been described as processing axial views of breast images, the present embodiments may be applied to any view of any part of a body without departing from the scope hereof.

Experimental Demonstration

Dataset: A dataset of 426 conventional breast DCE-MR exams was retrospectively collected at the University of Chicago over a span of 12 years (from 2005 to 2017) under HIPAA-compliant Institutional Review Board-approved protocols. Second post-contrast subtraction breast MRIs were used to create MIP images. For 350 cases, the women had only one diagnosed lesion, and this subset was set aside for independent testing of the BPE algorithm. The remaining 76 cases were used in developing the breast segmentation methods. All cases had BPE classification from prior clinical review.

Figure 4:
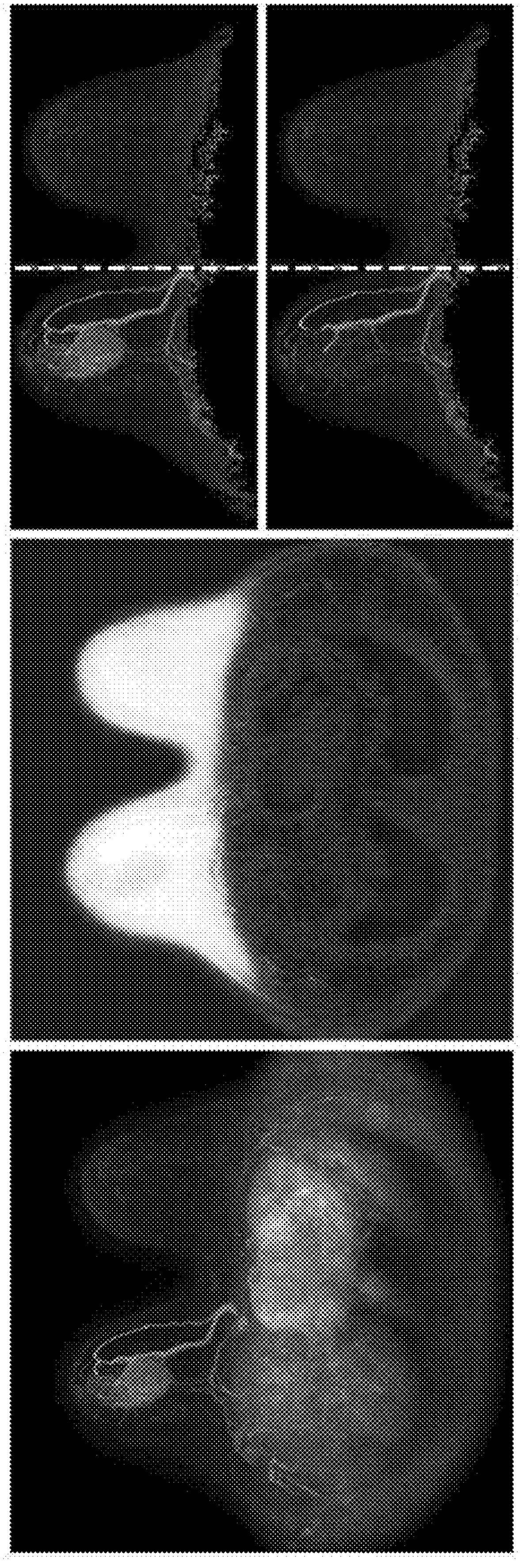
FIG. 4: Left: Example of a maximum-intensity projection (MIP) image. Center: Predicted U-Net breast segmentation. Right: Breast MIPs after applied binary U-Net mask, before (top) and after (bottom) electronic lesion removal. The dashed line indicates the split between affected and unaffected breast regions.

Breast Segmentation: Radiologist-delineated breast margins were obtained on the subset of 76 cases for use as truth for training a 2D U-Net convolutional neural network [2]. A binary threshold was applied to the U-Net outputs, and that breast region was vertically split between the left and right sides. These masks were then used to create MIP images of both breasts, the affected breast, and the unaffected breast (see FIG. 4).

Electronic Lesion Removal: A fuzzy c-means (FCM) clustering algorithm was used to segment the lesions from the DCE-MR images [1]. The lesion sizes, approximated by the square root of the lesion area at the center lesion slice, ranged between 2 and 65 mm. To electronically remove the lesions, the lesion area defined by the FCM segmentation was removed from the second post-contrast subtraction image of each slice that passed through the lesion before projecting the maximum pixel values from all available volume slices to produce a new MIP image. The masks that were applied to the original MIP images were used on the MIP images with the lesion removed to produce images of both breasts, the affected breast, and the unaffected breast without the influence of the lesion (see FIG. 4).

Computed BPE Score and Performance Metrics: For each of the defined breast regions (both, affected, and unaffected), the quantitative BPE scores were automatically calculated from the mean weighted-average pixel intensities of the rescaled MIP images (pixel values range from 0 to 1) on the independent dataset. The BPE scores were compared to radiologist ratings using Kendall's tau coefficient. Also, to investigate whether BPE levels are different for each breast, the BPE scores from the affected breast were compared to the unaffected breast before and after the lesion removal. Receiver operating characteristic (ROC) analysis was performed to determine the predictive value of the calculated scores for binary classification of Minimal vs. Marked BPE; it was also performed for binary classification of Low (Mild/Minimal) vs. High (Marked/Moderate) BPE. The statistical significance of the area under the ROC curve (AUC) having better performance than random guessing was determined using the z-test with Bonferroni corrections for multiple comparisons.

Results: On the independent test set, a statistically significant trend was found between the radiologist BPE ratings and calculated BPE scores for all breast regions, before and after the lesion removal. The BPE scores for the affected and unaffected breasts tend to be similar, and after the lesion removal, the affected breast scores became closer to the scores calculated for the contralateral, unaffected breast. As would be expected, the calculated BPE scores were reduced after the lesion removal; this was more obvious for larger lesions and cases with low BPE levels.

The AUCs for the task of classifying Minimal vs. Marked BPE and for the task of classifying Low vs. High BPE according to a radiologist rating were calculated for each of the breast regions (see Table 1 below). All classification tasks performed significantly better than guessing ($p<0.025$ from the z-test). The BPE scores from the affected breast, both before and after lesion removal, performed better than the BPE scores from the unaffected breast for both classification tasks. For all breast regions, the calculated BPE scores were a better predictor for Minimal vs. Marked BPE than for Low vs. High BPE levels.

TABLE 1

AUCs for the Task of BPE Level Classification Based on Calculated BPE Scores

| | Minimal vs. Marked BPE | Low vs. High BPE |
|---|---|---|
| Both breasts | AUC = 0.84 (p = 9.21e−15) | AUC = 0.66 (p = 7.94e−07) |
| Both breasts, removed lesion | AUC = 0.83 (p = 4.76e−14) | AUC = 0.66 (p = 5.39e−07) |
| Affected breast | AUC = 0.86 (p = 2.69e−26) | AUC = 0.68 (p = 3.92e−08) |
| Affected breast, removed lesion | AUC = 0.87 (p = 1.31e−21) | AUC = 0.68 (p = 1.43e−08) |
| Unaffected breast | AUC = 0.79 (p = 8.83e−08) | AUC = 0.66 (p = 6.82e−07) |

The automatically calculated BPE scores from all breast regions had a correlation with the radiologist's BPE rating. While the BPE scores from the affected and unaffected breasts were similar, the affected breast score was a better predictor of the clinical BPE rating than the unaffected breast score. The electronic removal of the lesion from the affected breast improved the predictions for the Minimal vs. Marked task, but not for the Low vs. High task. Additionally, based on the BPE scores from all breast regions, the classification of Minimal vs. Marked BPE outperformed the classification of Low vs. High BPE. These results indicate the worth of an automatic BPE scoring method that is not influenced by the contrast enhancement within lesions, which currently causes intra-observer variability in clinical BPE level assessment.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

REFERENCES

[1] Weijie Chen, Maryellen L. Giger, Ulrich Bick, A Fuzzy C-Means (FCM)-Based Approach for Computerized Segmentation of Breast Lesions in Dynamic Contrast-Enhanced MR Images, Academic Radiology, Volume 13, Issue 1, 2006, Pages 63-72, ISSN 1076-6332, https://doi.org/10.1016/j.acra.2005.08.035.

[2] Ronneberger, O., Fischer, P., Brox, T. (2015). U-Net: Convolutional Networks for Biomedical Image Segmentation. In: Navab, N., Hornegger, J., Wells, W., Frangi, A. (eds) Medical Image Computing and Computer-Assisted Intervention—MICCAI 2015. MICCAI 2015. Lecture Notes in Computer Science( ), vol 9351. Springer, Cham. https://doi.org/10.1007/978-3-319-24574-4_28.

What is claimed is:

1. A method for electronically removing a lesion from a three-dimensional (3D) medical image, comprising:

segmenting each two-dimensional (2D) slice of a sequence of 2D slices of the 3D medical image to identify the lesion within one or more of the 2D slices;

deleting the lesion from each 2D slice in which the lesion was identified to create a sequence of lesion-deleted slices;

constructing, based on the sequence of lesion-deleted slices, a lesion-deleted intensity-based projection image; and processing the lesion-deleted intensity-based projection image to obtain a background parenchymal enhancement (BPE) score.

2. The method of claim 1, wherein constructing comprises constructing a lesion-deleted maximum-intensity projection image.

3. The method of claim 1, wherein each 2D slice comprises a dynamic contrast enhanced magnetic resonance image.

4. The method of claim 1, wherein constructing comprises blocking, with a mask, one or more voxels of one or more of the 2D slices.

5. The method of claim 4, further comprising generating a mask for each 2D slice.

6. The method of claim 5, wherein generating the mask comprises:

inputting each 2D slice to a trained convolutional neural network (CNN) to obtain a corresponding region-of-interest; and binarizing the region-of-interest to obtain the mask.

7. The method of claim 6, wherein the trained CNN identifies a class label for each voxel of the 2D slice.

8. The method of claim 1, wherein deleting comprises replacing, for each voxel of a plurality of voxels forming the lesion, a value of the voxel with a replacement value.

9. A method for electronically removing a lesion from a three-dimensional (3D) medical image, comprising:

constructing, based on a sequence of two-dimensional (2D) slices of the 3D medical image, an intensity-based projection image containing a projection of the lesion;

segmenting the intensity-based projection image to identify the projection of the lesion;

deleting the projection of the lesion from the intensity-based projection image; and processing the intensity-based projection image, after the projection of the lesion is deleted from the intensity-based projection image, to obtain a background parenchymal enhancement (BPE) score.

10. A system for electronically removing a lesion from a three-dimensional (3D) medical image, comprising:

a processor;

a memory communicably coupled with the processor;

a lesion deleter implemented as machine-readable instructions that are stored in the memory and, when executed by the processor, control the system to:

segment each two-dimensional (2D) slice of a sequence of 2D slices of the 3D medical image to identify the lesion within one or more of the 2D slices, delete the lesion from each 2D slice in which the lesion was identified to create a sequence of lesion-deleted slices, and construct, based on the sequence of lesion-deleted slices, a lesion-deleted intensity-based projection image; and a background parenchymal enhancement (BPE) scorer implemented as machine-readable instructions that are stored in the memory and, when executed by the processor, control the system to process the lesion-deleted intensity-based projection image to obtain a BPE score.

11. The system of claim 10, wherein the machine-readable instructions that, when executed by the processor, control the system to construct include machine-readable instructions that, when executed by the processor, control the system to construct a lesion-deleted maximum-intensity projection image.

12. The system of claim 10, wherein each 2D slice is a dynamic contrast enhanced magnetic resonance image.

13. The system of claim 10, further comprising a voxel blocker implemented as machine-readable instructions that are stored in the memory and, when executed by the processor, control the system to block, with a mask, one or more voxels of one or more of the 2D slices.

14. The system of claim 13, further comprising a mask generator implemented as machine-readable instructions that are stored in the memory and, when executed by the processor, control the system to generate a mask for each 2D slice.

15. The system of claim 14, the mask generator including additional machine-readable instructions that, when executed by the processor, control the system to:

input the 2D slice to a trained convolutional neural network (CNN) to obtain a corresponding region-of-interest, and binarize the region-of-interest to obtain the mask.

16. The system of claim 15, wherein the trained CNN identifies a class label for each voxel of the 2D slice.

17. The system of claim 10, wherein the machine-readable instructions that, when executed by the processor, control the system to segment the 2D slice include machine-readable instructions that, when executed by the processor, control the system to cluster the 2D slice.

18. The system of claim 10, further comprising a medical imaging device for capturing the 3D medical image.

* * * * *